M. P. HERRES.
ADJUSTABLE TIGHTENING CONNECTOR.
APPLICATION FILED AUG. 19, 1919.
1,326,401. Patented Dec. 30, 1919.
Fig. 1.
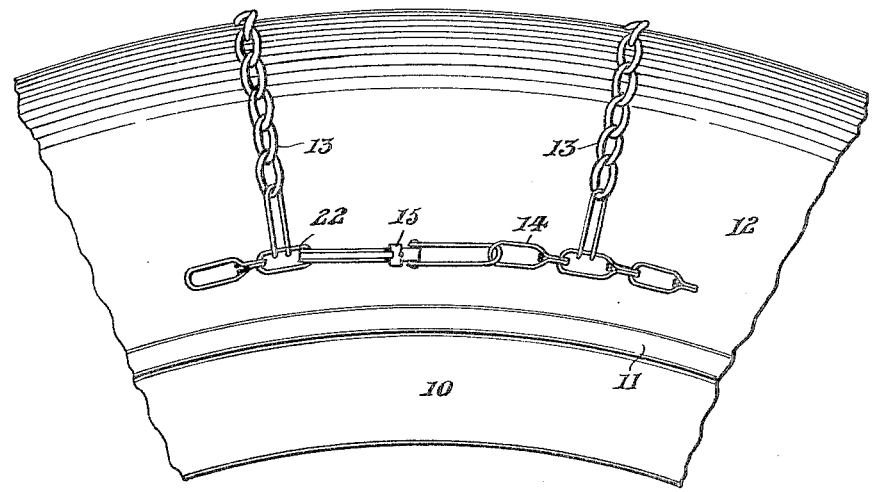
Fig. 2.
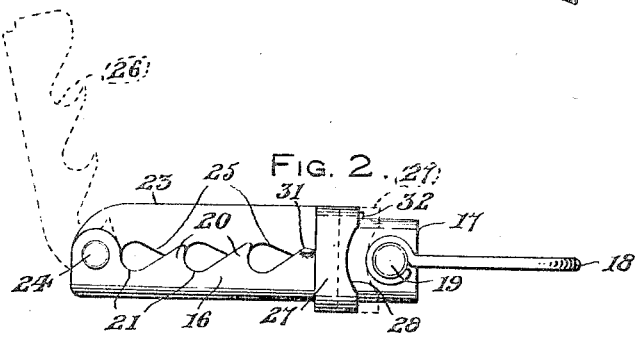
Fig. 3.
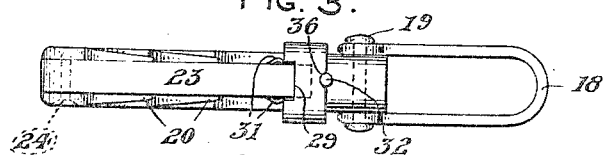
Fig. 4.
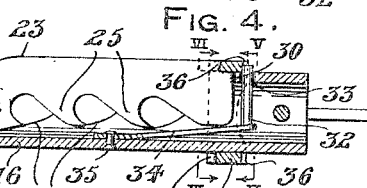
Fig. 6. Fig. 5.
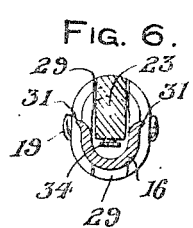 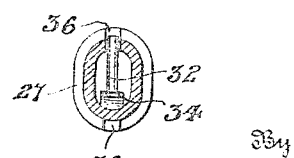
Inventor
M. P. Herres
By F. K. Bryant
Attorney

UNITED STATES PATENT OFFICE.

MICHAEL P. HERRES, OF POMEROY, WASHINGTON.

ADJUSTABLE TIGHTENING-CONNECTOR.

1,326,401.　　　　　Specification of Letters Patent.　　Patented Dec. 30, 1919.

Application filed August 19, 1919. Serial No. 318,563.

*To all whom it may concern:*

Be it known that I, MICHAEL P. HERRES, a citizen of the United States of America, residing at Pomeroy, in the county of Garfield and State of Washington, have invented certain new and useful Improvements in Adjustable Tightening-Connectors, of which the following is a specification.

The primary object of the present invention is the provision of a connector for chains, wires, and the like, whereby the members to be connected are easily and quickly tightened and then secured in their adjusted position.

A further object of the invention is to provide a tightener for automobile chains, whereby different adjustments are easily secured and the device locked against accidental release, the device possessing great strength and simplicity.

A still further object of the invention is to provide a fastener serviceable for the side chains of a non-skid member for tires, as well as for wire fences, a leverage action being provided by the device, for tightening the connected members, and thereafter locking the same in position, subject to manual release.

With these general objects in view and others that will appear as the nature of the invention is better understood, the same consists of the novel form, combination, and arrangement of parts hereinafter more fully described, illustrated in the accompanying drawings, and then claimed.

In the drawings forming a part of this application, and in which like reference characters designate corresponding parts throughout the several views, Figure 1 is a side elevation of a portion of an automobile wheel, having a non-skid chain secured thereon by my invention, Fig. 2 is an enlarged side elevational view, of the invention, illustrated by dotted lines in its open position, Fig. 3 is a top plan view thereof, Fig. 4 is a longitudinal sectional view of the same, and Fig. 5 and 6 are transverse sectional views taken upon lines V—V and VI—VI of Fig. 4.

Referring more in detail to the drawing, a portion of a wheel is illustrated in Fig. 1 having the usual felly 10, rim 11, and pneumatic tire 12, an anti-skid chain being secured upon the tire, consisting of cross chains 13, and side chains 14, the adjacent ends of the side chains being locked together by my form of connector 15.

My connector comprises a channel-shaped body 16 with a tubular extension 17 at one end to which a yoke 18 is pivoted by a pin 19, the said yoke being secured through the terminal link at one end of the side chain 14. Inclined teeth 20 in the opposite edges of the body 16 are adapted to receive the opposite terminal link of the side chain 14 seating within the curved sockets 21 between the teeth 20 when the body 16 is positioned through such terminal link, such as 22.

A lever 23 is pivoted by a pin 24, to the free end of the body 16, and has oppositely arranged teeth 25, for coöperating with the teeth 20, in holding the link 22. By referring to Fig. 2 of the drawing, it will be seen that a link may be positioned in the socket 26 between the adjacent teeth 25 of the lever 23, when the lever is opened, and that upon swinging the lever within the channel of the body 16, the link 22 will be carried into engagement with the corresponding socket 21 of the body. This operation not only stretches the side chain 14, by the leverage action of the lever 23, but also provides the opposite teeth 20 of the body 16 as well as the corresponding tooth 25 of the lever 23, for holding the link 22 with great strength when closed. The pull of the link 22 upon the teeth of both the body and lever, as noted, is calculated to provide a structure which will remain closed, when in use, the lever 23 serving to hook the link 22 over the teeth 20 of the body 16.

A lock for the lever 23 when closed, consists of a collar 27 slidable upon the extension 17, and prevented from being removed, over the extension by contact with the pin 19, or the adjacent portions of the yoke 18, curved cutaway portions 28 in the opposite sides of the collar, permitting the latter to move to the desired extent, for releasing the lever 23. A notch 29 also provides clearance for the free end of the lever 23, when the collar 27 is retracted, a corresponding notch 30 in the inner end of the extension 17, also serving a similar purpose. Outwardly flaring portions or ears 31, of the body 16, limit the movement of the sleeve 27, toward the free end of the body 16, and prevent the sleeve from being removed.

A bolt 32 slidably extends through an opening 33 in the extension 17, being normally projected therethrough by a spring 34 secured by a rivet 35 to the bottom of the channel. A recess 36 in the collar 27 is adapted for the reception of the bolt 32, when the collar is in its securing position over the lever 23. When so arranged, the lever 23 cannot be swung open upon its pivot 24, and is not likely to become accidentally released. Upon depressing the bolt, 32, against the action of the spring 34, the collar 27 may be manually moved toward the pin 19, and the lever 23 released, as illustrated by dotted lines in Fig. 2. When the parts are released, the lever 23 may be readily opened, and the link 22 removed. The sides of the body teeth 20 are tapered, for assisting the reception of the link 22 thereon, while the lever teeth 25 are of the same width as the lever, imparting great strength for holding the link 22 during the closing of the lever into the channel of the body 16.

What I claim as new is:—

1. A connector comprising a channel-shaped body with open teeth in the sides thereof, and with a tubular extension at one end adapted for attachment to one end of a member to be connected, a toothed lever pivoted to the opposite end of the body from said extension adapted for seating within the channel of the body, a collar slidably mounted upon said extension, adapted for overlying the adjacent end of the lever when closed, and a spring-pressed retaining bolt for said collar, when in its operative position.

2. A connector for link members and the like, comprising a body, having a channel with the sides thereof provided with opposite link-receiving teeth tapered inwardly toward the channel, a lever pivoted to one end of the body adapted for seating in the channel with transverse teeth adapted to coöperate with the teeth of the body, a tubular extension at the other end of the body, an attaching yoke pivoted to the extension, ears projecting from opposite sides of the body spaced from said yoke, a locking collar for the lever slidable upon the extension between said yoke and ears, and a spring-pressed locking bolt within the extension adapted for automatic projection within the releasing path of movement of the collar, when the collar is moved to its operative position overlying the free end of the lever.

3. A connector comprising a body, a lever pivoted to one end of the body, adapted for coöperation in receiving one end of a member to be connected, a tubular extension upon the other end of the body, a yoke pivoted to said extension adapted for attachment to the other end of the member to be connected, a leaf spring secured at one end in the body with its other end within the extension, a bolt upon the free end of said spring, adapted for automatic projection outwardly of the extension, and a retaining collar for the lever slidable upon the extension, positioned within the releasing path of movement of the collar, when the collar overlies said lever.

4. A connector comprising a channeled body having a tubular extension at one end, with a notch at its inner side, a coöperating lever pivoted to the other end of the body, adapted for movement through said notch, to its seating position, within the body, the said lever having a notch in the rear end thereof, a collar slidable upon the extension having a notch adapted for receiving the adjacent notched end of the lever, with the sleeve overlying the notched portion of the lever, when the lever is closed, and locking means for the collar.

5. A connector comprising a channeled body having a tubular extension at one end, with a notch at its inner side, a coöperating lever pivoted to the other end of the body, adapted for movement through said notch, to its seating position, within the body, the said lever having a notch in the rear end thereof, a collar slidable upon the extension having a notch adapted for receiving the adjacent notched end of the lever, with the sleeve overlying the notched portion of the lever, when the lever is closed, the said collar having a recess in the edge thereof opposite said notch, and the extension having a perforation alining with said notch when the collar is in its locking position, a bolt within the extension slidably positioned through said perforation, and a spring within the body adapted to automatically project said bolt through the perforation within said recess whereby the sleeve is prevented from releasing movement away from said lever, an attaching yoke pivoted to the extension adapted for limiting the movement of the collar in one direction, and outwardly projecting ears upon the body at opposite sides of the lever, when closed, adapted for limiting the movement of the collar in the other direction, whereby the same is prevented from being removed.

In testimony whereof I affix my signature.

MICHAEL P. HERRES.